Figure 1:
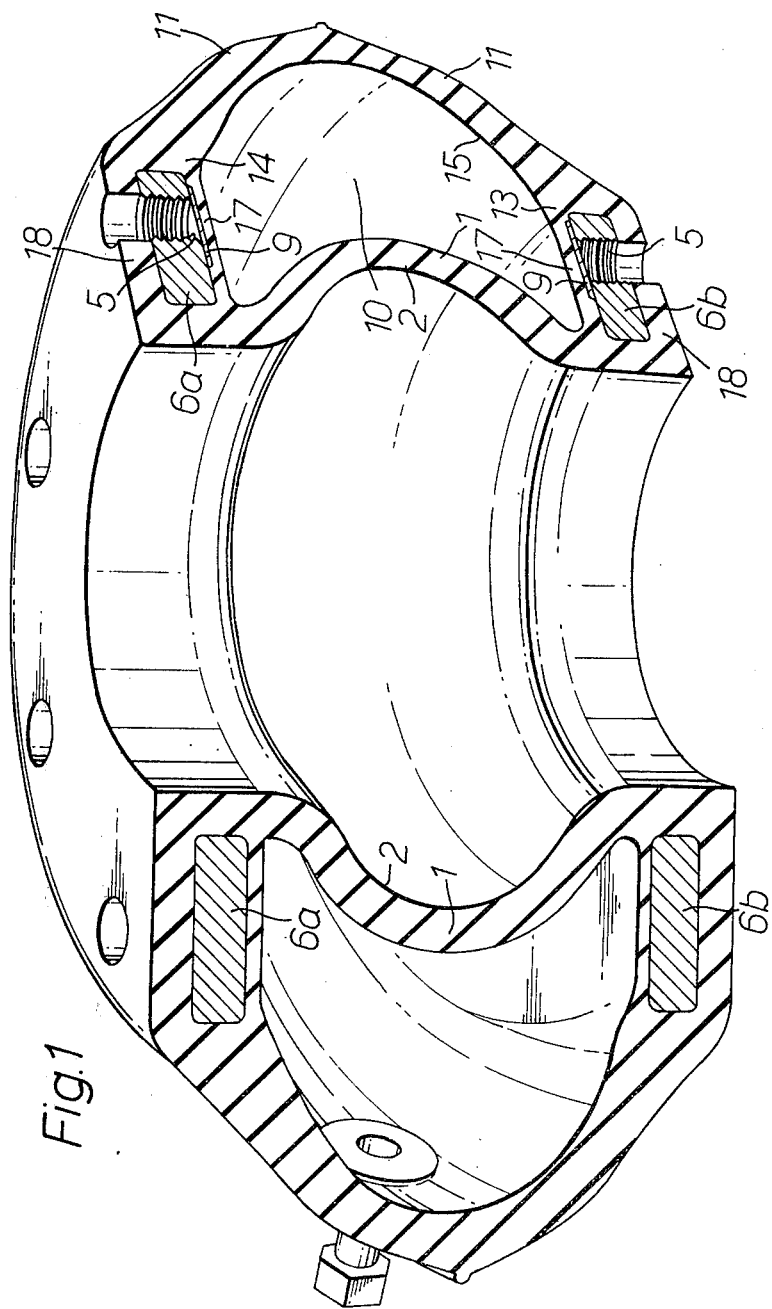

United States Patent [19]

Davy

[11] 4,258,938
[45] Mar. 31, 1981

[54] PIPE COUPLINGS

[75] Inventor: Patrick F. Davy, Horsham, England

[73] Assignee: Andre Rubber Company Limited, Surbiton, England

[21] Appl. No.: 18,517

[22] Filed: Mar. 8, 1979

Related U.S. Application Data

[63] Continuation of Ser. No. 866,869, Jan. 4, 1978, abandoned.

[30] Foreign Application Priority Data

Jan. 5, 1977 [GB] United Kingdom ............... 178/77

[51] Int. Cl.³ .......................................... F16L 27/10
[52] U.S. Cl. ................................... 285/93; 285/229
[58] Field of Search ............ 285/229, 226, 227, 228, 285/299, 300, 301, 93, 97, 235

[56] References Cited

U.S. PATENT DOCUMENTS

| 1,218,895 | 3/1917 | Porter | 285/299 X |
| 3,029,094 | 4/1962 | Parlasca et al. | 285/227 X |
| 3,039,795 | 6/1962 | Reuter | 285/235 |
| 3,299,417 | 1/1967 | Sibthorpe | 285/93 X |
| 3,473,828 | 10/1969 | Pearson | 285/229 X |
| 3,552,776 | 1/1971 | Leymann | 285/229 X |
| 3,695,637 | 10/1972 | Satterthwaite et al. | 285/229 X |

FOREIGN PATENT DOCUMENTS

| 2092992 | 1/1972 | France | 285/229 |
| 367019 | 3/1963 | Switzerland | 285/227 |
| 353520 | 7/1931 | United Kingdom | 285/226 |
| 763972 | 12/1956 | United Kingdom | 285/229 |
| 1194109 | 6/1970 | United Kingdom | 285/226 |
| 1395789 | 5/1975 | United Kingdom | 285/93 |

Primary Examiner—Thomas F. Callaghan
Attorney, Agent, or Firm—Fleit & Jacobson

[57] ABSTRACT

A pipe coupling comprising an elastomeric bellows having annular end faces which, in use, abut corresponding annular flanges of the pipes being coupled, the bellows further including an internal wall defining a passageway for fluid flowing through the coupling, and an external wall forming an annular cavity around the passageway, each of the walls having at least one arch to allow for expansion and contraction of the bellows.

5 Claims, 2 Drawing Figures

PIPE COUPLINGS

This is a continuation of application Ser. No. 866,869, filed Jan. 4, 1978 and now abandoned.

A pipe coupling which has been in use for many years, and which is described in our British Pat. No. 763,972, consists essentially of an elastomeric bellows. The opposing ends of the bellows include plane, annular faces which abut corresponding annular flanges of the two pipes being coupled. The bellows allow for expansion and contraction of the pipes and the elastomeric material also allows a limited amount of relative rotational and lateral movement between the pipes without damaging the coupling or impeding the flow of fluid through the coupling.

These couplings are satisfactory where a failure would not present any great risk. However, for applications in installations where a failure might have far-reaching consequences, such as in central heating systems, submarines, operating theatres or in the protection of expensive electronic equipment, there is a requirement for a fail-safe coupling which still allows for expansion and contraction of the pipes and some degree of rotational and/or lateral movement.

In accordance with the present invention there is provided a pipe coupling comprising an elastomeric bellows having annular end faces which, in use, abut corresponding annular flanges of the pipes being coupled, the bellows further including an internal wall defining a passageway for fluid flowing through the coupling, and an external wall forming an annular cavity around the passageway, each of the walls having at least one arch to allow for expansion and contraction of the bellows.

The two walls are preferably moulded as an integral unit and each wall preferably forms a single arch between the opposing end faces of the bellows. Where the outer wall joins the inner wall at each end of the bellows, the thickness of the elastomeric material is preferably increased and an annular metal plate is embedded in the thickened wall. The two plates lie in planes substantially parallel with end faces, and the annular flanges extending from the respective pipes are then bolted to the respective plates. In use, therefore, the elastomeric material between each plate and its respective pipe flange is compressed to form a hermetic seal.

Figure 2:
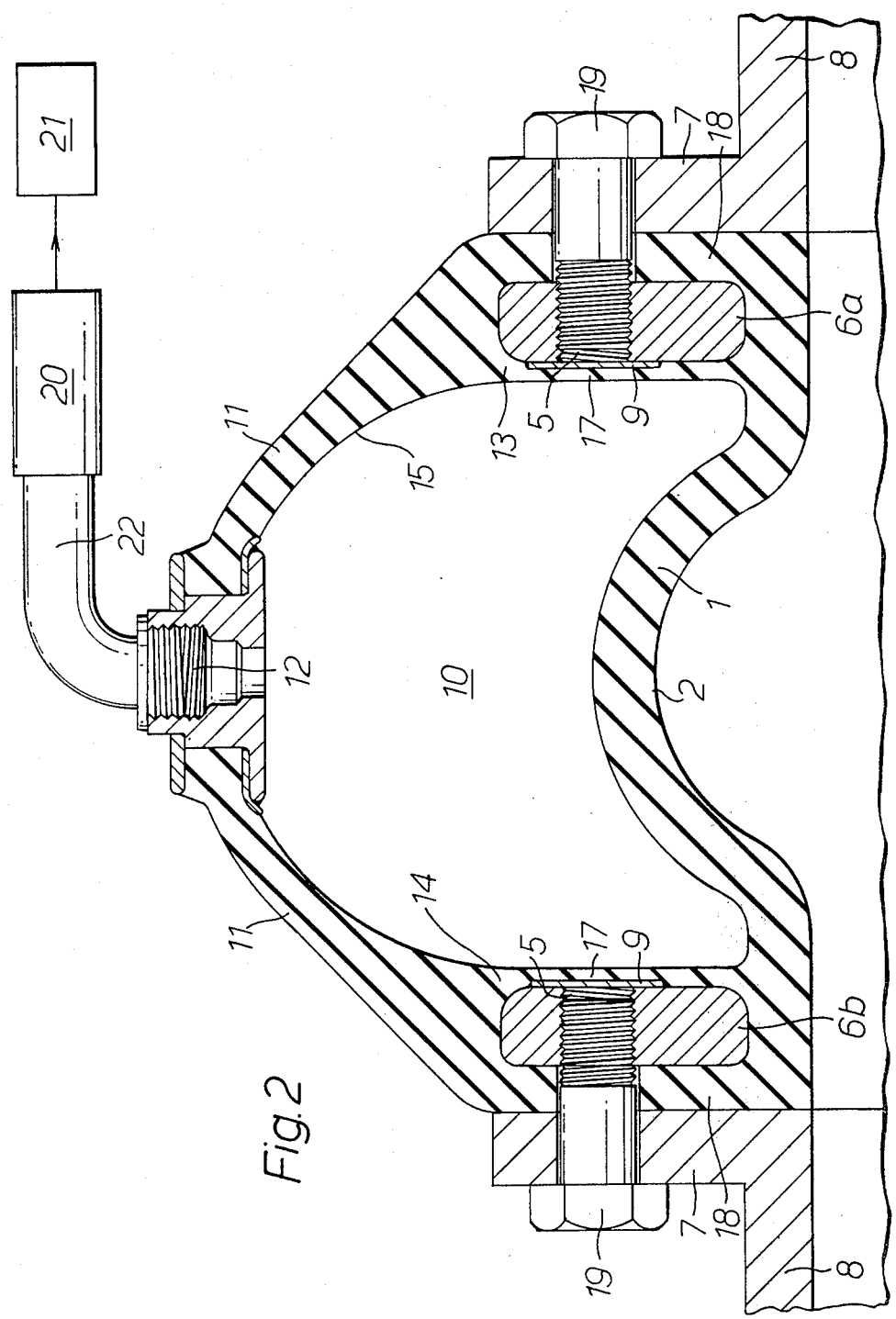

With this arrangement, a leak in the inner wall will merely allow fluid to flow into the annular cavity and, once the cavity has been filled, fluid will continue to flow through the coupling. The cavity is preferably filled with pressurized fluid and the coupling may include a sensing element for sensing either a change of pressure in the cavity or a change in some other condition such as the chemical composition or temperature of the fluid in the cavity. In a pressure sensing system, the pressure in the cavity is generally selected to lie between the system pressure (ie the pressure in the pipes) and atmospheric pressure. Thus a rise in pressure within the cavity will indicate a leak in the inner wall and a drop in pressure will indicate a leak in the outer wall. As soon as a leak occurs in either wall, this is detected by the sensing element and an alarm signal is generated. One example of the invention is illustrated in the accompanying drawings in which:

FIG. 1 is a general cut-away perspective view of a pipe coupling embodying the invention, and FIG. 2 is a cross-section through one half of the coupling and containing the longitudinal axis.

The illustrated coupling is formed of an elastomeric material, such as rubber reinforced with fabric. It includes an inner wall 1 forming a generally tubular bore but including at least one arch 2 between the opposing end faces 3 so that it forms a bellows which is able to expand or contract in the general direction of the bore. The elastomeric material also allows a limited amount of relative rotational or lateral movement between the opposing end faces 3.

One of these end faces 3 is illustrated in FIG. 1. It includes angularly spaced holes 4 communicating with tapped holes 5 in a metal plate 6a. In use, therefore, the face 3 is abutted against a flange 7 (FIG. 2) extending from the rim of a pipe 8, and the coupling is clamped to the flange by engaging bolts or studs in the threaded holes 5. A metal disc 9 is welded over the end of each threaded hole 5 to prevent any possibility fo fluid leaking through the bolted connection. In addition, the metal plate 6a is completely surrounded by the elastomeric material. A similar clamping arrangement is used at the other end of the coupling.

An annular cavity 10 is formed between the inner wall 1 and an outer wall 11, this cavity preferably being filled with fluid at a pressure which is different from the pressure of fluid flowing through the coupling. In use, therefore, a leak in the inner wall 1 will produce a change of pressure in the annular cavity 10. Since there would be no outward sign that such a leak had occurred, a pressure sensitive element 20 is connected by a pipe 22 to a union 12 which opens into the cavity. The element 20 may be a pressure guage which can be read directly or it may be connected to some form of alarm device 21. A leak in the outer wall 11 may also produce a change of pressure in the cavity 10. If the normal pressure in cavity 10 lies between atmospheric pressure and the pressure of the fluid flowing through the coupling, the alarm device 21 may be actuated either when the pressure exceeds a predetermined upper limit value, or when it falls below a predetermined lower limit value. The limit values are set so that normal variations in the pressure due, for example, to expansion and contraction of the bellows, will not produce false alarms.

Should the annular cavity 10 be subjected to system pressure, the high strain areas would be the areas 13 and 14, and the elastomeric material is therefore made sufficiently thick in these areas to substantially prevent the possibility of leakage. In particular, the bounding inner surface 15 of the outer skin 11 is spaced from the ends of the fabric reinforcement 16 so that the fabric cannot act as a wick to conduct fluid from the cavity into the layer 18 of elastomeric material which, in use, is compressed between the respective flanges of the pipes and the respective metal plates 6a, 6b. The layer 17 of the elastomeric material covering the inner face of each metal plate protects the metal plate from corrosion. To further reduce the strain in the high strain areas 13 and 14 the corners of the metal plates 6a, 6b may be radiused as shown in FIG. 2.

The illustrated coupling could be manufactured, for example, by first building up the inner skin layer by layer over a collapsible metal former, the layers overlapping one another as in the construction of a brick wall, and then locating the metal clamping plates 6a, 6b in position and building up the layers of rubber and fabric around these plates. Finally, a wax arch may be constructed to support the layers of the outer skin 11, this being built up layer by layer in a similar manner to the inner skin. Once the outer skin has been completed, the coupling may be introduced into the annular cavity of a mould and the rubber vulcanised by heating the mould while nitrogen under pressure is applied inside the coupling via inlet 12. After vulcanisation has been completed, the wax may be poured out through the opening 12 while still hot. The various fabric and rubber layers are thus moulded to form a singel composite structure.

An additional advantage of providing the second skin, or outer wall 11, is that the coupling is more resistant to atmospheric hazards such as the heat of a fire.

I claim:

1. A pipe coupling comprising an elastomeric bellows having annular end faces adapted to abut corresponding annular flanges of pipes being coupled, said bellows comprising an integral moulded one-piece elastomeric unit having a thick fabric-reinforced internal wall defining a passageway for fluid flowing through the coupling and a thick fabric-reinforced external wall, the external wall being of generally uniform thickness but being thickened in regions adjacent to the end faces; and annular metal plate embedded in the thickend regions of the external wall adjacent the respective end faces at each end of the bellows, each plate lying in a plane substantially parallel to said end faces and being surrounded by fabric-reinforced elastomeric material, each plate further including a plurality of threaded holes aligned with corresponding holes in respective end faces for receiving threaded ends of a bolt or stud such that the end faces may be bolted to the flanges of the pipes being coupled; the internal wall and external wall being spaced apart to form an annular cavity around the passageway, the cavity being fillable with pressurized fluid and a sensing element being positionable in fluid communication with and responsive to pressure within the cavity for providing an alarm output whenever the sensed pressure rises over or falls below predetermined limit values; and wherein the internal and external walls interconnect the annular end faces and each have a portion formed with at least one permanent, preformed, radially outwardly extending arch or corrugation, said portion of said internal wall lying between said annular end faces such that, together with said end faces, said portion provides a zig-zag or folded bellows construction which allows for axial expansion and contraction of the pipes joined by the coupling.

2. A coupling according to claim 14 in which a metal disc is secured to the metal plate over each threaded hole opening on the side of the plate remote from the respective end face.

3. A coupling according to claim 1 in which preselected corners of the metal plate are radiused.

4. A coupling according to claim 1 in which said annular cavity is filled with a fluid.

5. A pipe assembly including a pair of pipes coupled by a pipe coupling according to claim 1 and in which the pipes conduct fluid at a predetermined pressure and the annular cavity is filled with a fluid at a pressure which is different from the said predetermined pressure.

* * * * *